United States Patent [19]
McDonald

[11] 4,069,182
[45] * Jan. 17, 1978

[54] ELASTOMERIC PAVEMENT REPAIR COMPOSITION

[76] Inventor: Charles H. McDonald, 3130 W. Pierce St., Phoenix, Ariz. 85009

[*] Notice: The portion of the term of this patent subsequent to June 24, 1992, has been disclaimed.

[21] Appl. No.: 544,651

[22] Filed: Feb. 7, 1975

Related U.S. Application Data

[63] Continuation-in-part of Ser. No. 589,190, Oct. 21, 1966, abandoned, and Ser. No. 376,919, July 5, 1973, Pat. No. 3,891,585.

[51] Int. Cl.² ............................................. C08L 95/00
[52] U.S. Cl. .............................. 260/28.5 AS; 404/72; 404/74; 427/140; 427/204
[58] Field of Search .................. 260/28.5 AS; 196/22; 404/32, 67, 72, 74; 427/140, 204

[56] References Cited

U.S. PATENT DOCUMENTS

| | | | |
|---|---|---|---|
| 2,408,297 | 9/1946 | Cubberly | 260/28.5 AS |
| 2,688,005 | 8/1954 | Clayton | 260/28.5 AS |
| 2,690,418 | 9/1954 | Young | 196/22 |
| 2,728,734 | 12/1955 | Cubberly | 260/28.5 AS |
| 2,802,798 | 8/1957 | Smith | 260/28.5 AS |
| 3,891,585 | 6/1975 | McDonald | 260/28.5 A |

*Primary Examiner*—Lewis T. Jacobs
*Attorney, Agent, or Firm*—William G. Lane

[57] ABSTRACT

An elastomeric pavement repair composition for pavement failure and a method of preparation thereof comprising of paving grade asphalt and rubber. The asphalt is heated to an elevated temperature and the rubber is combined therewith. The resulting composition is mixed to form a hot jellied composition which can be applied to cracked or distressed pavements to repair the same.

22 Claims, 1 Drawing Figure

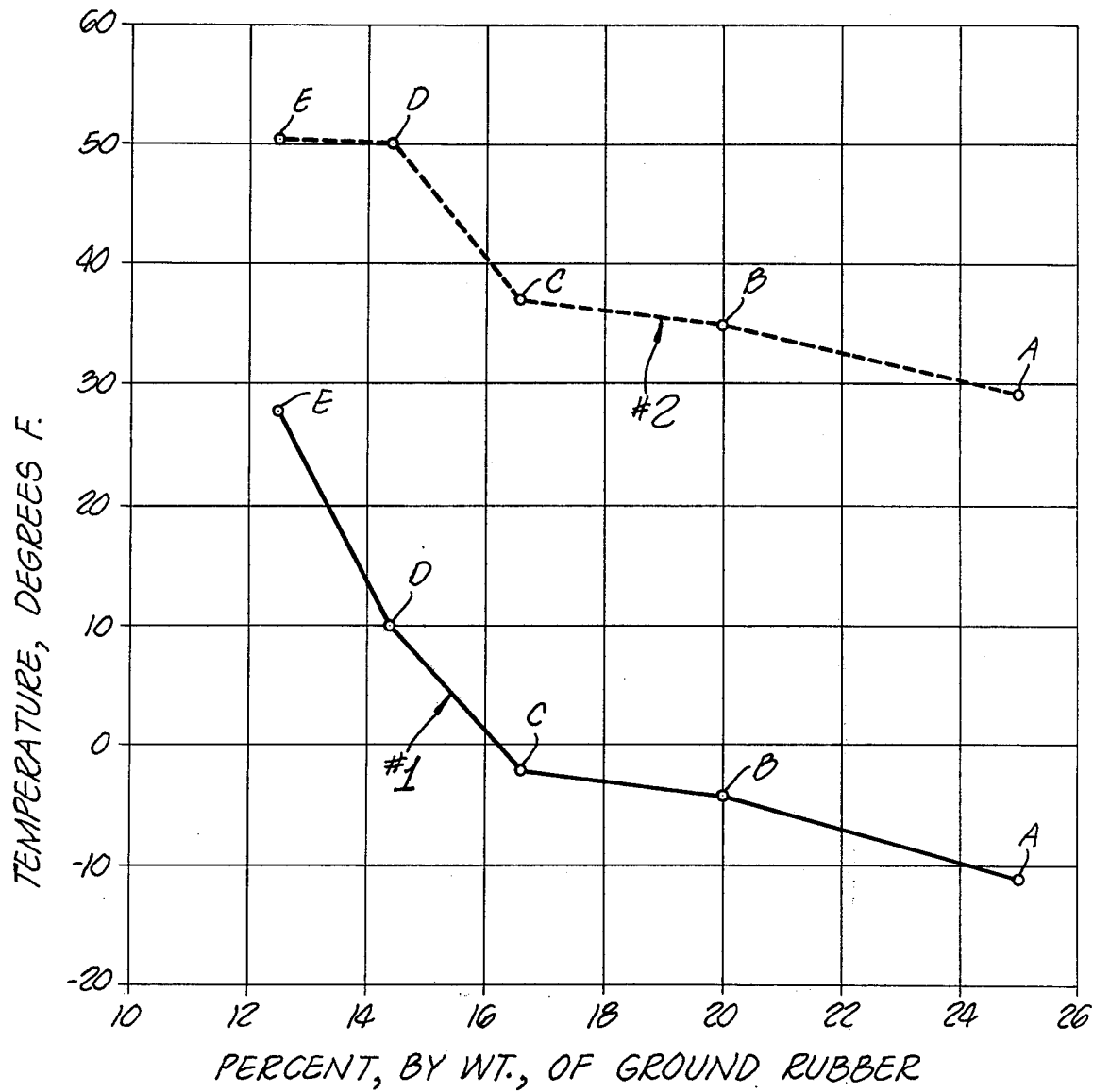

ELASTOMERIC PAVEMENT REPAIR COMPOSITION

This is a continuation-in-part application of my U.S. Patent application Ser. No. 589,190, filed Oct. 21, 1966, now abandoned, on An Improvement In The Material And Its Application For The Repair Of Asphalt And Asphalt-Type Pavement Fractures, which is incorporated by reference herein, and my U.S. Patent application Ser. No. 376,919, filed July 5, 1973, U.S. Pat. No. 3,891,585, issued June 24, 1975, on An Elastomeric Pavement Repair Composition For Pavement Failure And A Method Of Making The Same.

BACKGROUND OF THE INVENTION

The increasing volume of traffic, and particularly heavy traffic, has created a severe problem on many roads and streets in this country. This problem has resulted from elastic type failures in pavements which cause a "chicken-wire," or "alligator" cracking pattern in the pavement surface. This cracking is caused by fatigue of the pavement surface from repeated deflection. Conventional repairs by asphalt overlays are usually effective for a short period only and many other more drastic major repairs such as replacing the pavement surface or the pavement surface and its foundation, are too expensive and often as ineffective as asphalt overlays.

The so-called "flexible-type pavement" is actually not a particularly flexible structure. There are occasions when flexible-type pavements could be classified as very brittle, particularly in cold weather or when the pavement surface has suffered a long period of embrittlement from oxidation and age. The cracking caused by this lack of flexibility has created a tremendous problem, when considered on a nation wide scale. Traveling over the streets and highways of this country, one can seldom go more than a few miles without finding distressed pavement which is basically caused by repeated flexing by the surface of the pavement under the traffic loads.

This type of failure has been variously defined as flexure cracking, elastic-type failure, and fatigue failure. It is characterized by multiple cracking on the "chicken-wire," or "alligator" type pattern without plastic deformation of the pavement surface. The cracking is due to fatigue of the bituminous pavement mixture from repeated deflection of the pavement surface under vehicle load and subsequent recovery of the pavement surface. This deflection and recovery is caused by elasticity of some member of the substructure or foundation of the pavement surface. Fatigue failure is the most prevalent of the three most common types of failure occuring in flexible-type pavements. The other types of failure are:

1. The plastic type of failure, which is manifested by cracking in the pavement surface of the same character as found in elastic-type of failure, but is also accompanied by plastic deformation of the pavement surface. The surface is depressed under the loaded area and usually slightly raised at one or both sides of the loaded area. This type of failure is usually caused by an inadequate thickness of base material and is no longer a serious problem on highways or streets built under modern design criteria; and
2. The surface-type failure, which is characterized by attrition, or stripping and emulsification of the asphalt in the surface of the pavement. There is raveling and loss of material in the surface but no significant amount of cracking in the surface. Although this type of failure is very common, it is not as serious as fatigue-failure because it can be corrected by the application of a seal coat.

Fatigue cracking resulting from elastic-type failure is entirely different from the above two types of failure, and solutions to fatigue cracking have not only been difficult and expensive, but in many cases quite uncertain in their result because there is resilience in some member of the substructure. This resilience must be counteracted by either making the substructure or the surface so rigid that it cannot bend, or by making the surface so flexible that it will take the bending. Part of the difficulty in solving this problem lies in the fact that the deflections required to produce elastic-type failure are so small that almost complete elimination of the resilience in the substructure is required. Repeated deflections of a very small order are sufficient to produce this type of failure. Various authorities have given figures for a critical deflection which range from 0.010 to 0.050 inches with a certain probability that the critical deflection would vary considerably for pavements of different thicknesses, composition, asphalt grade, asphalt content, asphalt quality, prevailing temperatures, and a radius of the deflection curve (see McDonald, C. H.; The Elastic Type of Pavement Failure and Some of Its Causes; 38th annual Conf. of WASHO; 2) Hveem, F. N.; Pavement Deflections and Fatigue Failures; HRB BULL. 114 pp. 43–79, 1955; 3) McDonald, Charles H.; The Flexural Failure of Sand-Asphalt Mixes as Related to Resilient Subgrades, Highway Materials Conf., Denver, CO, 1959.).

Complicating the solution to the problem of repairing fatigue cracking from elastic-type failure is the fact that the source of such a small magnitude of elasticity may be difficult to determine. The elasticity may be either in the subgrade, subbase, or base course. An increase in the normal moisture content of even a good subgrade, caused by frost action for instance, may cause the subgrade to become "quickie" resulting in a condition where vehicle load is born by hydro static pore pressure. Although such a condition does not ordinarily last for a long time, there is almost no reasonable thickness of overlying material or pavement that will prevent the deflection caused by the vehicle load on the pavement surface. The pavement surface of a four foot fill over a quickie soil has been observed to visibly deflect under vehicle load. This condition also develops in densely graded base courses through frost action.

Certain materials present in soils, such as mica, have elasticity within themselves, and the economic necessity of using local materials may require that these materials be incorporated in the structure. Such materials are often the only ones available in the particular area that can be used without incurring excessive costs for preparation and construction of the substructure. Perhaps the most common cause of substructure elasticity is entrapment of minute quantities of air in fine-grained subgrade soil. Any soil which is capable of moderate capillary pressure can entrap air under certain moisture conditions by holding it in pores which are sealed on all sides by capillary moisture. Capillary pressure is sufficient to prevent the air from being expelled under traffic loading. If enough of these entrapped air cells are involved in a substructure, the structure has a pneumatic character. In extreme cases such soils have an almost rubber-like elasticity when pressed between the fingers. The moisture content need only be slightly above optimum to entrap air. This type of soil is surprisingly prevalent throughout the United States. In my opinion, the increasing use of cement-treated bases is, whether recognized or not, an attempt to overcome this problem of substructure elasticity by stiffening the substructure with cement. The so-called "up-side-down" method of construction in which the subbase is cement-treated, rather than the base, is quite obviously an attempt to stiffen the substructure against resilience from an underlying member. This is practiced rather commonly in New Mexico and Arizona (see Johnson, Charles W.; "Comparative Studies of Various Combinations of Treated and Untreated Bases and Subbases for Flexible Pavements", ARB BULL. 289, p pp. 44–56, 1961; and Arizona Highway Department, Special Provisions, Interstate Projects on I-10-4, "Tucson to Picacho Peak.").

The use of a rigid portland cement concrete pavements has also been quite effective; however, the cost is generally prohibitive for indiscriminate use. Again, the obvious motive in using rigid concrete pavements is to make the pavement structure so rigid that it will not be affected by resilience of the substructure.

An attack against this type of failure, elastic-type failure, has also been mounted from the other standpoint of attempting to make the bituminous mixture more flexible (see McDonald, Charles H.; The Need for Greater Flexibility in the Surface of Flexible Type Pavements, Conf. on Soils Eng., Univ. of Ariz. Tucson, 1954). This has been done by the use of open-graded plant mixes employing very heavy asphalt films on each aggregate particle of the pavement mixture. These mixes have large void spaces so that the high asphalt content, in relation to surface area, will not cause distress. This type of pavement design has helped to ameliorate the situation, but it has not been a cure all.

Similarly, small percentages of rubber incorporated in mixes have also been used. These small percentages of rubber have undoubtedly been beneficial, although information on the degree of success obtained with these mixes for this purpose appears to be somewhat limited. It is my opinion, that the cost of these materials has prevented the use of rubber in the amounts necessary to give the pavement true elasticity. I recognized that an entirely new approach was needed to repair pavements subject to elastic-type failure and that the approach I developed and invented, which is described below, is completely different in its use of rubber from anything which I have read. My approach embodies the use of a relatively high percentage of rubber, combined with asphalt, in a relatively thin application to the pavement surface. The purpose is to keep the overall cost in balance but still obtain maximum elasticity of the pavement material. This approach is unique and, to this date has been completely successful in some extremely difficult situations.

Asphalt-rubber compositions are described and claimed in many patents; however, none of these patents disclose the unique elastomeric material that I have prepared from rubber and asphalt. Preparations of asphalt containing rubber have been prepared in the past by workers in the art. For example, the Wilkinson U.S. Pat. No. 108,666 discloses a roofing compound composed of ground anthracite coal, ground gypsum, ground tan-bark, India rubber dissolved and prepared coal tar and/or commercial pitch. In the Tickstone U.S. Pat. No. 1,590,644 a hard composition containing rubber and bitumen is disclosed which is useful as a substitute for porcelain, earthware, ebonite, vulcanite and the like is disclosed. This composition contains principally slate powder and lesser amounts of ground rubber and optionally bitumem and/or coloring matter. The Sadtler U.S. Pat. No. 1,758,913 discloses a rubberized-asphalt mixture which is useful as a road covering. The mixture is prepared by adding aggregate to a pug mill; adding liquefier or asphalt-solvent to saturate the entire aggregate; adding rubber to the saturated aggregate so the finished mixture contains only one half of one percent rubber based on the weight of the total asphalt added; adding asphalt or other bituminous material to the mixture at a temperature of 250° F or higher. The Grant U.S. Pat. No. 2,040,256 discloses a rubberized-asphalt composition for sealing pipe joints and the like. The composition is prepared by melting asphalt at a temperature not in excess of 180° C (375° F). Ground tacky rubber is added to the molten asphalt. The resulting mixture is raised to a temperature of 245° C (475° F) for a period of not less than 10 minutes. The temperature is maintained while the mixture is stirred unitl no lumps of rubber are detectable in the mixture. The resulting composition consists of 0.5 to 15% rubber and 99.5 to 85% asphalt. The ductility of the composition is slightly less than that of the asphalt and its penetration is not more than 2% less than that of the asphalt. The Rhodes et al U.S. Pat. No. 1,884, 240 discloses a rubberizedtar product prepared by heating and stirring rubber, water-gas tar and coal tar and/or pitch until a homogenous mass is obtained. Sulfur is added to the mixture and thoroughly mixed therein. The Taylor U.S. Pat. No. 2,686,169 discloses a method of incorporating rubber latex into hot bitumen, the resulting composition contains 2 to 6% rubber. The Endres et al U.S. Pat. No. 2,700,655 discloses a powdered rubber-containing composition for incorporation in the asphalt. The powdered composition contains from 10 to 50% rubber and from about 90 to 50% filler. Dasher U.S. Pat. No. 2,853,742 discloses a method of producing powdered rubber scrap vulcanized rubber material which can be employed for mixing with asphalt for the production of bituminous concrete paving mixtures as well as in the production of various types of asphalt coatings and similar compositions in which it is desired that a portion of the rubber be present in the coating. The rubber is prepared in a Banbury machine. The Endres et al U.S. Pat. No. 3,127,367 discloses a method and apparatus for adding latex to hot asphalt to obtain a composition containing between 1 and 2% rubber. The Endres et al U.S. Pat. No. 3,202,623 discloses a dry, powdered rubberized composition for incorporating into asphalt. The composition is prepared by combining a water suspension of hard bitumen with rubber latex and then co-precipitating the mixture by means of a coagulant to yield a product containing 5 to 40% by weight rubber. The Peaker et al U.S. Pat. No. 3,242,114 discloses a method of dispersing a rubber-resin composition into asphalt. The resulting composition contains from 1 to 20 parts of rubber per hundred parts of asphalt. The Endres U.S. Pat. No. 3,253,251 discloses paving blocks composed of rubberized bitumen cement and rubber aggregate. This invention can be visualized as blocks of aggregate rubber particles bound by rubberizedasphalt cement. The rubberized bitumen cement contains a very small percentage of rubber.

A commercial product, Ramflex, a powdered rubber specially devulcanized in less than 5 minutes for use in combination with asphalt and aggregate, for asphaltic-type pavement is produced by the U.S. Rubber Reclaiming Company, Inc. RAMFLEX rubber is mixed in a pug mill with asphalt and aggregate. Five to ten percent of RAMFLEX rubber is used for each part of asphalt employed in the total mixture. The total mixture is prepared by adding hot stone or sand and filler to a pug mill in the usual manner; then RAMFLEX rubber is added to the pug mill and mixed 10 to 20 seconds; finally the asphalt is mixed therein for an additional 30 seconds. The material is then ready for application.

The above patents show that rubberized asphalt compositions are old in the art. However, not one of the previous workers in the field made the startling discovery that when certain portions of rubber and asphalt are heated and mixed together a jellied composition is formed which makes an excellent elastomeric paving repair composition.

SUMMARY OF THE INVENTION

The elastomeric material of the present invention is a formulation of paving grade asphalt with penetration ranges of 10 through 300 and a hydrocarbon rubber (as defined hereinafter), such as commercially-processed reclaimed rubber or unprocessed rubber buffings and optionally, aggregate (crushed rock, gravel, or stone). The asphalt and rubber are combined in proportions and at temperatures to form a gel which, when cooled, results in a tough, elastic mass. Mineral aggregate may be added either to the hot mixture of asphalt and rubber, or subsequently after application.

The use of asphalt containing rubber in such high percentages and temperatures as to cause gelling in the formation of a completely elastic mixture when heated, fortified with crushed rock for wearability, is unique in its formulation and its application for pavement repairs. Previously known uses of combinations of asphalt, rubber and aggregate in surface applications for repair of asphalt roadways have depended upon the aggregate component for the body of the mixture. Approximately 95% of the prior art mixture would be aggregate and the remainder would be asphalt containing about 5% rubber, that is rubber would constitute 0.25% of the total mixture. The resultant conventional repair mixture is a stiff and relatively non elastic mass when cooled that can only absorb limited pavement movement without cracking.

The unique concept in the elastomeric material of the present invention and its application lies in the face that the asphalt-rubber component is depended upon for the body of the mixture in contrast to aggregate as in the prior art mixtures. In the present application, the final surface is comprised of approximately 5% to 15% of the elastomeric material and 95 to 85% of aggregate although smaller and larger amounts of aggregate can be used. By making the rubber content of the elastomeric material high enough (approximately 30%) a solid is formed when the rubber and asphalt are heated to a gel and allowed to cool that is completely elastic and will move with the underlying surface without cracking. In the present application, the aggregate component only takes the abrasive wear of traffic and does not constitute the working body of the mixture. In the present invention, the aggregate may be used as a dressing only instead of being mixed integrally.

The present material can be used when relatively large areas or cracked pavement are to be repaired. The asphalt and rubber are heated and mixed at the site and then spread with conventional equipment to a depth of less than one-quarter inch, although other thicknesses can be applied. Aggregate, such as crushed gravel, is then spread on the surface of the asphalt-rubber elastomeric mixture as a dressing, for the purpose of taking the abrasive wear of traffic. When the elastomeric material is applied hot, a tack coat can often be omitted. Under the present method of repair, the surface, the base and subgrade of the pavement do not have to be dug up and replaced with new materials as would be necessary for permanent repair of the pavements by existing methods. Thus, the use of the present elastomeric material may be a substitute for reconstruction.

Repairs made with the present material are more permanent than those made with existing materials because they are completely elastic and do not crack under repeated deflections as do conventional paving materials. A high percentage of the maintenance costs of repairing asphalt surfaces arises from the fact that repeated repairs of the same location, caused by movement of the sub-structure, are required when fatigue-type cracking of pavement is involved.

I have found that a rubber-asphalt material could be made to have the consistency of a thick slurry or gell when hot which forms a tough elastic mass when cooled. I have found that the best consistency for our purpose could be obtained by heating paving grade asphalt to from about 350° to about 500° F and then stirring into it rubber, such as partially devulcanized reclaimed rubber (a commercial product), in the proportion of about two to three parts of asphalt to about one part of rubber. The laboratory tests showed that the consistency of the final product depended not only on the rubber content, but also on degree of solution or jelling and surface interaction of the rubber. The higher the temperature of the mixture, the greater the degree of solution and surface interaction of the rubber and the asphalt and the more nearly the end product resembled the properties of rubber rather than asphalt. In other words, when the material is mixed briefly at a temperature of 350° F it is quite fluid and has a consistency of a thin slurry. This would be very convenient for placing; on the other hand, it would be more temperature susceptible so that it would tend to bleed more readily in the summer, be more brittle in cold weather, and would have less elasticity than a thicker product. A similar situation occurs when the rubber content of the material is reduced. In other words, the material can be made at any consistency desired, but it must be remembered that in doing so the properties of the final product will be changed. The thinner the hot product, the more nearly its properties will resemble those of asphalt and the thicker the product, given the same temperature and proportions of rubber and asphalt, the more the end product will resemble rubber.

The elastomeric composition has been prepared from a variety of rubbers, such as ordinary reclaimed rubber. Ground whole tire rubber, asphalt soluble rubber, unprocessed rubber tire buffings and salvaged tire rubber are also used in the elastomeric material.

The claimed elastomeric material consists essentially of asphalt and rubber of certain proportions which have been heated together within a specified temperature range to form a jellied composition. The claimed material consists essentially of paving grade asphalt and rubber in weight ratio or between about 1 and about 5 to about 1 respectively. The asphalt is heated to a temperature between about 300° and about 500° F and the rubber is mixed therein to form a reaction product, the jellied composition. This elastomeric material has several exceptional and unexpected properties. For example, it does not reflect underlying fatigue cracks after application on the cracked distressed pavement. As shown above, the conventional pavement repair materials such as hot mix, sand-asphalt and slurry seal cannot be successfully employed to repair cracked-distressed pavements because cracks reflect through the repair material. Surprisingly, the claimed elastomeric material can be used to successfully repair cracked-distressed pavement by merely covering the surface of the pavement with a thin layer, e.g. about one-quarter inch thick, of the hot elastomeric material. In addition, the elastomeric material has excellent and unexpected weatherability and wearability on pavement. For example, several cracked-distressed pavements repaired with the elastomeric material have been subject to severe inundation without any detrimental effects on the claimed material (see the examples). The claimed elastomeric material has shown exceptional wearability under severe traffic conditions as shown in the examples. As of 1973, seven years after the preparation, two of the panels of Example 1 were still in service. The other panels, as described in the examples, were destroyed when the streets were rebuilt. Because of its repair, weatherability and wearability characteristics, the claimed invention has seen widespread commercial use, such as on highways, mountain roads, desert roads and airport runways, over the last several years.

When the first elastomeric compositions were prepared according to the present method, I believed that asphalt-rubber mixtures containing less than about 25% rubber would not gel, that is form a jellied composition, when combined in the manner described herein. However, my recent experimentation and testing has shown that mixtures containing as little as 12½% rubber will gel to a degree although not to the extent that an asphalt-rubber composition, containing about 17% or more rubber, does. This result was unexpected. In addition, I believed that the elastomeric properties of the composition would gradually and proportionately decline with a proportionately decreasing rubber content of the composition in a linear fashion. Quite surprisingly I have found that although the elastomeric properties of the compositions do decrease with decreasing rubber content of the composition, the decrease in elastomeric properties is neither proportionate nor linear (See Example X and FIGS. 1 & 2). Quite unexpectedly, the elastomeric compositions containing at least about 16- % rubber have striking elastomeric properties when compared with asphalt-rubber compositions containing no more than about 14-2/7% rubber.

The novel elastomeric composition of the present invention on a weight basis is not as inexpensive as conventional repair materials. However, the cost of the material is not out of line with heavier overlays which are commonly used and generally unsuccessful in combating the problem of fatigue cracking or with slurry seals also commonly used and generally unsuccessful in preventing reflection cracking. In maintenance repair work, the cost of the material is relatively a minor item. The big cost item in maintenance repair work is the labor involved. A product that will eliminate repeated repairs to the same distressed pavement area has a tremendous economic advantage over the conventional repair materials. Moreover, the present composition is applied to the pavement in relatively thin layers between one-tenth and one-half inch in thickness. Since the material can be layed in relatively thin layers the economics of the present product are not out-of-line when compared with conventional materials.

The elastomeric material of the present invention will flow into the chicken-wire or alligator pattern cracks and bond the fractured pavement together with an elastic bond to prevent further surface cracking and penetration of moisture. Other materials used for this purpose, such as asphalts, or asphalts with little rubber content, are primarily plastic with little or no elasticity to take or recover from repeated deformation, particularly in cold weather when they become very brittle. The elastomeric material of the present invention is unique in that it retains some flexibility under all weather conditions.

DESCRIPTION OF THE DRAWING

FIG. 1 is a graph showing elastomeric failure (as determined by a first method) of asphalt-rubber compositions with respect to rubber content; and FIG. 2 is a graph showing elastomeric failure (as determined by a second method) of asphalt-rubber compositions with respect to rubber content.

DETAILED DESCRIPTION OF THE INVENTION

The elastomeric paving repair composition is prepared by heating asphalt, preferably paving grade asphalt with a penetration range of 10 through 300, to a temperature within the range of from about 300° to about 500° F, preferably from about 350° F to about 425° F, to form a hot liquid asphalt, and adding particulate rubber thereto. The resulting mixture is thoroughly mixed until the composition gels, that is becomes jellied. No additional heating is required once the rubber is added to the asphalt. About one part rubber is added to about one to about five parts of hot asphalt. I have used 85-100 penetration grade asphalt in my test work for convenience although other penetration grades of paving asphalt such as 10-10 grade, 10-20 grade, 40-50 grade, 60-70 grade 120-150 grade and 200-300 grade paving asphalt are also suitable and are used for practice of the invention.

Hydrocarbon rubbers are used in the present invention. By the term "hydrocarbon rubber" is meant non-oil resistant asphalt-soluble rubbers. Non-oil resistant asphalt-soluble rubbers are those rubbers that are partially soluble in asphalt to the extent from about 2 to about 12% by weight and are attacked by, react with, or are affected by oils, such as lubricating oils, hydraulic oils and the like. Suitable rubbers that can be employed include unvulcanized, vulcanized or reclaimed rubbers including natural rubber, (NR, polyisoprene polymer), isoprene rubber (IR, polyisoprene polymer), butadiene rubber (BR, polybutadiene polymer), butadiene-styrene rubber (SBR, butadiene-styrene copolymer), butyl rubber (IIR, the isobutylene isoprene polymer) and ethylene propylene rubber (EPM and EPDM, ethylene propylene copolymers and terpolymers which are unvulcanized, vulcanized or reclaimed.

The reclaimed rubber can be devulcanized or partially devulcanized and can be prepared from vulcanized or unvulcanized rubber by the digester process, Heater or Pan process, high pressure steam process, Lancaster-Banbury process, or other conventional reclaiming processes (Maurice Morton, *Introduction to Rubber Technology*, Van Nostrand Reinhold Co., New York, 1959, pps. 404–435). Normally the reclaimed rubber will be prepared from old, worn tires, tire scrap, innertube scrap, retread scrap, tire peel, tire carcass, rubber buffings and other rubber scrap.

In the practice, other types of rubbers, that is, oil resistant and/or non-asphalt soluble rubbers have not been found suitable for preparing the hot elastomeric pavement repair material. For example, rubber which has not been found suitable for the composition are: nitrile (NBR, butadiene acrylonitrile copolymers), epichlorohydrin (ECO, epichlorohydrin polymer and copolymer), neoprene rubber (CR, chloroprene polymers), hypalon (CSM, chlorosulfonated polyethylene polymers), urethane rubber (AU, EU, urethane polymers or elastomers), polysulfide or thiokol rubber (T, organic polysulfides), silicone rubber (Si, organic silicon polymers), fluoro silicone rubber (FSi, fluorinated organic silicone polymers), fluoro elastomer (FTM, fluorocarbon polymers), acrylic rubbers and polyacrylates (ACM, copolymer of acrylic ester and acrylic halide). These rubbers have been found to be unsuitable for the present invention because they do not react in the desired manner with asphalt under the described conditions to form the required jellied composition.

The following types of rubbers are preferred for use in the invention (1) ground whole tire rubber (with and without carcass fabric residue); (2) unprocessed rubber buffings, this is rubber buffings that have not been subject to devulcanization or reclaiming processes (a by-product of tire retreading); (3) ground innertubes (natural rubbers and synthetic butyl rubbers); (4) reclaimed rubber (5) partially devulcanized reclaimed rubber; and (6) asphalt soluble rubber. The preferred particle size for the rubber is from about 4 mesh to about +200 mesh USS. Unprocessed rubber refers to rubber that has not been chemically or thermally altered. Unprocessed rubber includes rubbers that have been ground, screened, decontaminated, and treated to remove metals, cord and fabric therefrom.

Once the hot jellied composition has formed, the composition is applied directly to the pavement area to be repaired. The surface area to be coated is first swept clean of all debris and made thoroughly dry. Optionally, a tack coat of hot asphalt, solvent cut asphalt such as kerosene and asphalt, or an asphalt solvent, such as gasoline or kerosene can be applied to the area to be repaired. Alternatively, if the pavement surface is asphaltic, the surface can be made adhesive and tacky by heating with a torch or the like. The hot elastomeric material is then applied to the area to be repaired to form a continuous layer averaging in thickness of from about one-tenth to about one-half inch. Thicker or heavier layers can be applied. The hot elastomeric composition can be applied by spraying, mopping. or shoveling the composition onto the surface. As soon as possible after application, preferably immediately after application, sand or mineral aggregate or chips are applied on top of the hot elastomeric material and rolled therein to provide a protective wearing surface for the hot elastomeric composition. The aggregate is normally sized to one-fourth or three-eighths inch but other size aggregate can be used.

The grading or sizing for mineral aggregate or chips used on street repair work can vary but I have found the following three-eighth inch nominal size chip very successful:

| Sieve Size | % Passing |
|---|---|
| ½" | 100 |
| ⅜" | 70–100 |
| #8 | 0–5 |
| #200 | 0–2 |

The chips can be optionally treated with asphalt to eliminate dust. The chips are coated by heating them to a temperature between 250° and 325° F and pre-coating them with a small amount of asphalt. With ⅜ inch nominal size chips, the application rate is about 25 – 40 pounds of chips per square yard of hot elastomeric material.

When repairing pavements in the airport area, we prefer to use ¼ inch nominal chips because there is less hazard that the chips will be torn loose from the elastomeric material and sucked into the jet engine where they can do severe damage. The following ¼ inch nominal size chip specification has been found to be very satisfactory for airport use.

| Sieve Size | % Passing |
|---|---|
| ⅜" | 100 |
| ¼" | 80–100 |
| #8 | 0–5 |
| #200 | 0–2 |

The hot elastomeric material can also be dressed with sand or a mixture of aggregate and sand.

The temperature susceptibility of the elastomeric rubber-asphalt pavement repair material is far less than with paving grade asphalt alone. This is, of course, a tremendous advantage in achieving control of reflective cracking. The elastomeric material retains some flexibility down to about freezing temperatures although it does soften some under summer heat, it apparently does not soften to such a point that it is picked up by vehicular traffic. The elastomeric material will be quite soft to the touch when warm and show tracking under truck tires. However, instead of the material shoving and rolling under vehicular traffic, it rebounds and tends to resume its original location. A somewhat leathery skin develops on the surface of the elastomeric material after application and cooling which is dry and resists pickup. The elastomeric material will pick up, however, if a tacky material such as asphalt is applied to this dry surface. However, the aggregate or sand covering protects against this type of problem.

Patching by this process is comparable in labor costs to that of the manufacture and placing of slurry seal. The hot elastomeric material after application can be smoothed out with a rubber squeegee in the same manner that slurry seal is smoothed out when applied to a street. Alternately, and preferably, the hot elastomeric material can be sprayed on the surface to be repaired, in which application a smoothing operation is not required. A cover aggregate surface is then added to the composition to prevent traffic pick up. As soon as the aggregate surface has been applied and the composition allowed to cool, traffic may be allowed on the repaired surface almost immediately. In contrast, when a pavement surface is repaired with slurry seal, a considerable curing time must elapse from the time of application before traffic can be permitted to use the repaired street; otherwise vehicular traffic will destroy the repaired street surface.

As far as I have been able to judge, there is no apparent difference in the performance of pavement repair panels made with compositions repaired with partially devulcanized reclaimed rubber and shredded rubber obtained from a local vulcanizing shop. The ideal temperature for asphalt, in preparation and mixing of the elastomeric composition, appears to be from about 410° to about 430° F.

A field study under my supervision was made to determine the location of the most severe test conditions that could be found for the use of the elastomeric pavement repair material. My desire was to locate pavements where the traffic was heavy, preferably with a high percentage of heavy truck traffic, and where severe elastic-type failure had already occurred. I also sought an area where poor drainage was involved and one of the test areas did have exceedingly poor drainage. Descriptions and examples of the working of the present invention are set forth in the following examples. Further information regarding the present invention can be found in my paper entitled, A NEW PATCHING MATERIAL FOR PAVEMENT FAILURES, published in the *Highway Research Record*, No.146, pps. 1–16, of the Highway Research Board, Div. of Eng., National Research Council, National Academy of Sciences — National Academy of Engineering, Washington, D.C. (1966), which is incorporated by reference herein.

The elastomeric material can be used to seal and/or fill joints or cracks in surfaces, such as road cracks and joints, cracks and joints in dam surfaces, cracks and joints in "tank walls" and the like. The elastomeric material, optionally, may be mixed with aggregate chips or sand when employed for crack and joint filling or sealing. Joint and crack sealing and filling is carried out by injecting the hot elastomeric material, that is the jellied composition, into the crack or joint to fill the same. Thereafter the material is allowed to cool. The elastomeric material adheres to the surface of the crack or joint and rarely separates from the surfaces of the joint or crack crevice upon cooling or with age. Accordingly, the elastomeric material makes an excellent seal that expands and shrinks with expansion and shrinkage of the joint or crack caused by temperature changes.

A joint or crack in a surface is sealed or filled by first cleaning foreign material out of the joint or crack crevice. Cleaning can be accomplished with a broom, air stream, or other gas, water jet or other mechanical or pneumatic means. If the surfaces of the joint or crack crevice are weak, cracked and/or friable, the surfaces are, preferably, routed, or chisled out, to yield clean, solid surfaces. The hot elastomeric material is injected into the crack or joint crevice by pouring the hot material into the crevice, or injecting the hot material, under pressure, into the crevice, or shoving, tamping and working the hot elastomeric material into the crevice.

Injecting and injection herein shall mean injecting, pouring, shoving, tamping and working the elastomeric material into a joint or crack crevice.

Preferably, the entire crevice is filled even with the plane of the surface with the hot elastomeric material. The hot material is then allowed to cool. Before the material sets up, the exposed material, optionally, may be dressed with aggregate chips or sand or covered with plastic, rubber, or felt film, cloth or sheet.

The elastomeric material does not appear to have a significant coefficient of thermal expansion. Accordingly, the material does not shrink and separate away from the surfaces of the joint or crack crevice upon cooling. In addition, the material as it cools has little tendency to shrink into the crevice as many conventional sealer and filler compositions do upon cooling, setting, or drying.

EXAMPLE I

The following elastomeric pavement repair material panels were applied to a street where the traffic volume numbered 13,200 vehicles per day, a large portion of which were trucks because this street served an industrial area. The pavement surface of this street was generally covered by alligator-pattern cracking in an advanced state and the drainage was extremely poor. After a rain storm a portion of the street was frequently inundated.

An elastomeric composition was prepared from two parts of 85–100 penetration asphalt and one part of partially devulcanized reclaimed rubber. The mixture was applied at a temperature of 420° F at a rate of one gallon of the hot elastomeric material per square yard of pavement surface. After application, cover aggregate (mineral aggregate) was spread over the surface to prevent pick up. Traffic was turned onto the repaired surface within three quarters of an hour after application of the aggregate. This was sufficient time for curing as the material set up on cooling. The resulting layer of elastomeric material was about one-fourth inch thick. The clean-cover aggregate after spreading over the hot elastomeric material surface was tamped into the composition.

Approximately three weeks after placement of the above repair panel, the area was subject to 58 hours of steady rain and partial inundation while the street was being pounded by traffic. The test section was not affected; however, conventional sand-asphalt mixes which had been placed over adjoining areas were cracking. These same sand-asphalt panels were raveling due to partial emulsification of the asphalt. A few months later these sand-asphalt patches were almost completely destroyed, but the elastomeric pavement repair panel made of the rubber-asphalt mixture showed no reflection cracking from the underlying cracks or any other distress.

Another panel of the same composition as the above panel was applied to an area of the pavement which had been tacked with MC-250 liquid asphalt. Traffic was held off this patched area for about two hours after the application of the aggregate. This patch or repair panel was subjected to the same conditions as the above panel and held up equally as well even after being subjected to severe rains and heavy traffic, including heavy truck traffic.

An elastomeric composition was prepared from five gallons of 85–100 penetration grade asphalt and 21 lbs. of partially devulcanized reclaimed rubber (two parts of 85–100 penetration grade asphalt to one part rubber by weight). The temperature of the asphalt was 420° F and the rubber was added thereto and mixed therein. The pavement area being repaired was initially tacked with four parts of 85–100 penetration grade asphalt diluted with five parts of kerosene. The hot elastomeric mixture was spread over the pavement area being repaired in a patch or repair panel having a thickness of one-fourth to one-half inches in depth. The entire panel was completely covered with aggregate and rolled with a steel roller. This panel was spread at a different rate than the foregoing panels which would average to a depth of approximately 0.18 inches thickness (1 gallon/square yard). This particular panel was spread to a depth of one-fourth to one-half inch and was followed with a ¼ inch cover aggregate.

The above panels until their destruction, when the street was completely rebuilt, showed no reflection cracking. The only effect that could be observed on the panels some six months after their application was a small amount of spread of the panel in the direction of traffic.

A hot elastomeric pavement composition was prepared from two parts of 85–100 penetration asphalt and one part of unprocessed shredded rubber from a retreading shop. The asphalt was heated to a temperature of 440° F; thereafter, the rubber was heated and mixed with the asphalt to form the hot elastomeric composition. The composition was applied to the pavement at the rate of one gallon of composition per square yard of surface area giving a patch having a thickness of 0.10 inch. The pavement surface was first tacked with kerosene cut asphalt (4 parts 85–100 penetration grade asphalt and 5 parts kerosene). The hot elastomeric material, after application, was completely covered with ¼ inch seal coat aggregate and turned over to traffic. This panel remained in excellent condition until it was destroyed when the street was completely re-built. No cracking or stripping occurred up to the time of its destruction although some spreading occurred in the direction of traffic.

EXAMPLE II

The following elastomeric pavement repair panels or patches were situated on a street having a daily traffic volume of from 30,800 to 38,400 vehicles per day. Most of the traffic was passenger vehicle traffic. There was severe alligator-type cracking in the wheel tracks of the street but that had not spread generally over the street as the cracking had occurred in the street described in the previous example.

An elastomeric paving composition was prepared from five gallons of 85–100 penetration grade asphalt and 21 lbs. of partially devulcanized reclaimed rubber (two parts of 85–100 penetration grade asphalt to one part rubber). The temperature of the asphalt was 430° F when the rubber was added and mixed thereto. The resulting elastomeric pavement repair material was spread over an area of 5.3 square yards to give a patch having a thickness of about one-fourth to one-half inch. The panel was rolled with a steel roller after placing cover aggregate. Prior to applying the hot elastomeric composition, the area repaired was tacked with a solvent cut asphalt consisting of four parts of 85–100 penetration grade asphalt and five parts of kerosene. While rolling this panel with a steel roller to set the cover aggregate, some of the hot elastomeric composition was squeezed up through the cover aggregate and the roller picked it up creating a bald spot or two. This did not appear to affect the properties of the patch, but the rolling of the hot elastomeric material when it was too hot caused an uneven penetration into the cover aggregate, resulting in a certain roughening of the surface texture. This roughness was eventually ironed out under traffic.

After a half years use, the repair panel was very soft and spreading in the direction of traffic and to the sides causing thin spots with some minor resultant reflection cracking. This panel appeared to be softer than the panels of Example I. This is probably due to a combination of an excess of tack coat and greater thickness of the rubber-asphalt material resulting in slower curing. Ideal average thickness seems to be about 0.2 inches which is obtained by spreading 1 gallon of the hot elastomeric material over a square yard of the pavement surface.

A hot elastomeric composition was prepared from fifteen gallons of 85–100 penetration grade asphalt and sixty-two pounds of partially devulcanized reclaimed rubber (two parts of asphalt to one part of rubber). The resulting composition was applied over 20 square yards of surface area (one gallon of the hot elastomeric composition per square yard of pavement surface) and covered with a cover of aggregate. The pavement was first tacked with kerosene cut asphalt. This material was placed over a portion of a long strip of failed pavement area. The remaining portion of the same strip was repaired by a conventional maintenance slurry seal patch approximately a week later. The slurry seal patch showed distress after only a week of emplacement and completely failed a few months after emplacement. About five months after initial emplacement, the slurry seal patch was replaced with a hot asphaltic-concrete mix. At this time, the elastomeric pavement repair patch is still in good condition except for a few spots which had been picked up by the roller during placement. At the time the hot asphaltic-concrete mix was emplaced, several slurry seal patches containing small percentages of latex were placed on adjoining areas. These patches also failed because the rubber content of the slurry seal is in sufficient to give the patch the required elasticity. All the slurry seal patches had to be completely replaced approximately three months after placement. The elastomeric pavement repair patch was in good condition at this time except for small exceptionally thin spots where reflection cracking showed up to a minor degree. The ¼ inch cover aggregate used on this patch was completely covered by the elastomeric rubber-asphalt composition after a few days of traffic. In the spot where the cracking occurred, the aggregate had not been covered as there was insufficient elastomeric material to squeeze up around it. Where the normal thickness of the elastomeric composition was obtained, there was no reflection cracking.

EXAMPLE III

An elastomeric pavement repair patch was placed on a street which had a traffic count of 18,500 vehicles per day. Many of these vehicles are of the commercial and industrial type. This street section was in an area which had given continuous trouble for street maintenance for some time.

An elastomeric composition was prepared from two parts of 85–100 penetration grade asphalt to one part of locally obtained, unprocessed, shredded tire rubber by weight. The asphalt was heated to a temperature of 420° F when mixed with the reclaimed rubber to form a hot jellied composition. The area to be repaired was tacked with a solvent cut asphalt consisting of four parts of 85–100 penetration grade asphalt and five parts of kerosene. The hot elastomeric composition was spread over the tacked area at an average thickness of 0.18 inches and the hot material was completely covered with ¼ inch seal coat aggregate.

At the same time the above patch was applied, a hot mixed sand-asphalt patch was applied to an adjoining area. Four months after application, the elastomeric rubber-asphalt pavement repair patch was still in good condition whereas the sand-asphalt patch was failing. No evidence of spreading or cracking was found in the elastomeric pavement repair patch.

EXAMPLE IV

The following pavement repair test panels were applied to the same street as described in Example I. An elastomeric composition was prepared from two parts of 85-100 penetration grade asphalt and one part of partially devulcanized reclaimed rubber by weight. The temperature of the asphalt was about 430° F when the rubber was added and mixed therein. The resulting hot jellied elastomeric composition was spread over an area of two square yards at a rate of one gallon of hot elastomeric material per square yard of pavement area. After application, the hot elastomeric material was completely covered with ¼ inch seal coat aggregate and turned over to traffic. At the time of application, the atmospheric temperature was 101° F and the pavement temperature was 138° F. The day after application, the test panel was subjected to nearly an inch of heavy rain. The patch showed no sign of damage although it was subjected to traffic in a completely submerged condition for hours. This patch held up exceedingly well showing no cracking or stripping until it was finally destroyed when the street was rebuilt.

A hot elastomeric composition was prepared from two parts of 85-100 penetration grade asphalt to one part of No. 30 mesh ground whole tire rubber (rubber No. 9306 of U.S. Rubber Reclaiming Co.). The asphalt was heated to a temperature of 450° F when the rubber was added thereto and mixed therein to form the jellied composition. The hot elastomeric composition was applied to the pavement surface at the rate of 1 gallon of the composition per square yard of street area. After application, the hot elastomeric material was completely covered with ¼ inch seal coat aggregate and turned over to traffic. At the time of application, the atmospheric temperature of 101° F and the pavement temperature was 138° F. The consistency of the elastomeric composition was too thick for proper spreading. The resulting patch showed disconnected areas. It appears that the hot elastomeric mixture should consist of relatively greater amounts of 85-100 penetration grade asphalt for best workability when preparing the material from ground whole tire rubber. This patch was also subjected to a heavy rain storm the day after its application. The patch showed no sign of damage although it was subjected to traffic in a completely submerged condition for many hours. Although the surface was rough after application, the surface ironed out under traffic after a period of 1 month. This patch held up in excellent condition without stripping or cracking until it was completely destroyed when the street was rebuilt.

An elastomeric composition was prepared from three parts of 85-100 penetration grade asphalt to one part of No. 30 mesh ground whole tire rubber (Rubber No. 9306 of the U.S. Rubber Reclaiming Co.). The asphalt was heated to a temperature of 400° F then the rubber was added thereto and mixed therein to form the hot elastomeric composition. The hot elastomeric composition was applied to the street at the rate of one gallon of the composition per square yard of pavement area. After application, the material was completely covered with concrete sand and turned over to traffic. The atmospheric temperature at the time of application was 107° F officially, the atmospheric temperature three feet above the pavement was 114° F, and the pavement temperature was 156° F. This patch held up exceedingly well until completely destroyed when the street was rebuilt. At the time of its destruction, it showed no sign of reflection cracking or stripping.

An elastomeric composition was prepared from two parts of 85-100 penetration grade asphalt to one part of No. V-17 Asphalt Soluble Rubber (A product of the U.S. Rubber Reclaiming Co.). The asphalt was heated to a temperature of 410° F when the rubber was added thereto and mixed therein to form the hot elastomeric composition. The hot elastomeric composition was spread over the pavement area at a rate of one gallon of composition per square yard of pavement surface. After application, the composition was completely covered with concrete sand and turned over to traffic. At the time of application, the atmospheric temperature was 107° F, the atmospheric temperature three feet above the pavement was 114° F and the pavement temperature was 156° F. This repair patch held exceedingly well until its final destruction when the street was rebuilt. At the time of destruction, the panel showed no sign of reflection cracking or stripping.

As shown in the above examples, a tack coat can be applied before placement of the hot elastomeric material to the pavement surface to be repaired if desired. At first it appeared desirable to have a tack coat for the best results. However, subsequent results show that a tack coat may not be necessary. The important thing is to have the surface of the pavement to be repaired clean of all debris and dry. If the surface is to be tacked, the surface can be tacked with hot asphalt, solvent cut asphalt, emulsified asphalt, or by heating the pavement surface, if it is an asphaltic pavement surface, with a torch to make the surface adhesive and tacky.

EXAMPLE V

One hundred grams of 85-100 penetration grade aphalt were weighed into each of four separate beakers. The beakers were labeled No. 1, No. 2, No. 3 and No. 4 and the contents were heated to 350° F, 400° F, 450° F, and 500° F respectively. Fifty grams of partially devulcanized reclaimed rubber were mixed with the asphalt contents of each beaker to yield the following results:
1. Temperature at time of mixing — 350° F.
    Consistency — thin slurry
    Mixed for 2 min. before observing consistency.
    Consistency after 16 hr. curing at 140° F — soft, sticky, and stringy.
    Consistency after 4 hr. curing at 250° F — soft.
2. Temperature at time of mixing — 400° F.
    Consistency — slurry.
    Mixed for 2 min. before observing consistency.
    Temperature after mixing — 300° F.
    Consistency after 16 hr. curing at 140° F — soft, sticky, and stringy.
    Consistency after 4 hr. curing at 250° F — soft.
3. Temperature at time of mixing — 450° F.
    Temperature after mixing — 330° F.
    Mixed for 2 min. before observing consistency.
    Consistency — thick slurry.
    Consistency after 16 hr. curing at 140° F — semi-soft, not sticky.
    Consistency after 4 hr. curing at 250° F — soft.
4. Temperature at time of mixing — 500° F.
    Temperature after mixing — 350° F.
    Consistency — very thick slurry Mixed for 2 min. before observing consistency
Consistency after 16 hr. curing at 140° F — spongy, not sticky.
Consistency after 4 hr. curing at 250° F — soft.

The elasticity of the cold elastomeric composition was better with the compositions mixed at the higher temperature and was the best with sample No. 4 which was prepared at 500° F. However, the hot workability of sample No. 4 was very poor at a temperature of 500° F. Compositions prepared at asphalt temperatures between about 400° and about 450° F appear to be most satisfactory. The elastomeric composition was somewhat brittle at 19° F but ductile at 36° F.

EXAMPLE VI

The four elastomeric compositions prepared in the previous example were cooled to room temperature. A pea size portion was taken from each sample and placed on a shiney piece of tin plate and the tin plate was placed in the oven at an angle of 30°. The amount of flow for each sample was observed under various temperatures to yield the following results:

| [Sample No.] (Mixing Temp.) | [Flow] |
|---|---|
| Flow at 170° F for 2 hr. | |
| 1 (350 deg) | very small |
| 2 (400 deg) | none |
| 3 (450 deg) | none |
| 4 (500 deg) | none |
| Flow at 210° F for 4 hr. | |
| 1 (350 deg) | very small |
| 2 (400 deg) | none |
| 3 (450 deg) | none |
| 4 (500 deg) | none |
| Flow at 330° F for 2 hr. | |
| 1 (350 deg) | 4 in. |
| 2 (400 deg) | 2 in. |
| 3 (450 deg) | 3 in. |
| 4 (500 deg) | none |

EXAMPLE VII

One gallon of the elastomeric pavement repair material made for the last two panels in Example I were molded in a steel concrete cylinder test can. After the mixture had cooled, the cans were removed and the two specimens were removed. Each block measured 6 in. in diameter and 7 to 8 inches in height. The specimen molded from the elastomeric pavement repair material and the last patch in Example I was the designated specimen A and the specimen molded from the elastomeric pavement repair material from the next to last patch in Example I was designated as specimen B. These specimens were tested for elasticity (compression and recovery) as follows. The height of each specimen was determined; each specimen was compressed by applying a vertical load until a 2 in. displacement in height was observed. The load was removed in one test immediately, and another test 5 minutes after the 2 in. displacement. The height of each specimen was measured at intervals of 0 time, 1 hour, 12 hours after the load had been removed. The recovery height of each specimen was determined as an indication of the elastic properties of the material. Recovery in inches as the percentage of the 2 in. displacement length, was designated as the percent of the recovery of the elastomeric pavement repair material. The following results were obtained:

Specimen A

Mixing temperature of aphalt: 440° F.
Height of test specimen before loading: 7.75 in.
Height of test specimen with load: 5.75 in.
Height of test specimen 1 hr. after immediate release of load: 7 in.
Percent recovery = 1.25/2 = 63 percent.
Height of test specimen before loading: 6 in.
Height of test specimen when loaded for 5 min.: 4 in.
Percent recovery (1 hr. after removing load) = 0.5/2 = 25%.
Height of test specimen 12 hr. after removing load: 5 in.
Percent recovery 12 hr. after removing load = 1 in./2 in. = 50 percent.

Consistency Test

Cured for 24 hr. at 140° F.
Observation: sticky and soft.

Specimen B

Mixing temperature of asphalt: 420° F.
Height of test specimen before loading: 7 in.
Height of test specimen with load: 5 in.
Height of test specimen 1 hr. after immediate release of load: 6.75 in.
Percent recovery 1 hr. after release of load = 1.75/2 in. = 88 percent.
Height of test specimen when loaded for 5 min: 4.75.
Height of test specimen 1 hr. after release of load: 6 in.
Height of test specimen 12 hr. after removing load: 6.50 in.
Percent recovery 1 hr. after removing load applied for 5 min. = 1 in./2 in. = 50 percent.
Percent recovery 12 hr. after removing load applied for 5 min. = 1.5 in./2 in. = 75 percent.

Consistency Test

Cured for 24 hr. at 140° F.
Observation: gummy and firm.

It appears that the temperature of the asphalt at the time of mixing with the rubber has an effect on the elastomeric composition product. Specimen B showed more resiliency and elasticity than Specimen A, possibly indicating some damage to the rubber at higher asphalt temperatures. However, in field practice we have found that there is a time-temperature correlation and high asphalt temperatures do not necessarily affect the elastomeric product if the hot composition's high temperature is not maintained for a long period.

The above examples show that the use of either reclaimed rubber, conventional shredded rubber derived from buffings, ground whole tire rubber, tire buffings, and asphalt soluble rubber together with a paving grade asphalt in the proportions of from about 1 part of rubber to about 2 to 3 parts of asphalt prepared into the elastomeric pavement repair composition of the present invention will prevent reflection cracking from elastic-type failures caused by fatigue cracking of the pavements at a very nominal cost. It is believed that this has never been achieved by skin patching the pavement surfaces with any other material. This should prove to be a boon to maintenance forces throughout the country who are plagued with repairing this type of failure in asphaltic and concrete pavements.

EXAMPLE VIII

Asphalt (penetration grade 120-150) was heated to a temperature of 475° F. Rubber tire buffings were added to the hot asphalt in the proportion of three parts of asphalt to one part of rubber. Ninety-eight percent of the rubber passed a No. 25 Sieve (AASHO Designation M-92). The rubber was free from fabric, wire or other contaminating materials. The rubber had a small amount of calcium carbonate (not more than 4%) which was included to prevent the rubber particles from sticking together. The resulting mixture was mixed for a period of less than 5 minutes to form a jellied semi-fluid material which was the hot elastomeric material. The pavement surface to be repaired was swept clean of all debris and thoroughly dried. The mixture was sprayed onto the pavement surface at a pressure between about 70 and about 100 lbs. per square inch at a rate of between 1 and 0.75 gallons per square yard of pavement surface area. About 40 lbs. of cover aggregate were spread over the hot elastomeric material after its application. The cover aggregate had a wear percentage of not more than 40 at 500 revolutions as determined by AASHO T-96. The aggregate was clean and free of any coating. Seventy-five percent by weight of the aggregate was retained on a No. 16 Sieve and this portion had at least one fractured face produced by crushing. After the aggregate was spread, it was compacted into the hot elastomeric material with a roller. The application of the aggregate and its compacting was performed within 15 minutes of application of the hot pavement repair material onto the pavement surface.

I have found that when the hot asphalt is heated to a temperature of 440° F or less, the hot elastomeric pavement repair material prepared therefrom requires more than 5 minutes of mixing with the rubber. In such a situation, preferably 95% of the rubber shall pass a No. 16 Sieve and not more than 15% of the rubber shall pass a No. 25 Sieve. When the asphalt is heated to a temperature between 440° and 500° F, the hot elastomeric material is formed in less than five minutes after the rubber has been added and mixed with the hot asphalt. At the temperatures of 475° and 500° F, the hot elastomeric composition is frequently formed in a matter of seconds. When the composition is prepared with asphalt at temperatures in excess of 440° F, preferably 98% of the rubber shall pass a No. 25 Sieve.

In geographical areas where the temperatures seldom go below freezing, an excellent elastomeric pavement repair material can be prepared from about three parts asphalt to about one part rubber. In areas where freezing occurs more than once or twice during the year an excellent elastomeric pavement repair material can be prepared from about 7 parts asphalt and about 3 parts rubber by weight.

When a large surface is to be repaired, and several panels are to be laid, all joint edges of the previous laid patches should be swept clean of overlapping cover material. Naturally precaution should be taken to avoid skips and overlaps at joints to protect the surfaces of adjacent structures from being spattered or marred when opened to vehicular traffic.

After application of the present elastomeric pavement repair material and aggregate, the surface of the street is only raised approximately three-eighths of an inch in height so it does not significantly reduce curb height or interfere with or require changes in subsurface drainage construction, manhole covers and the like.

The present elastomeric pavement repair composition ages far more slowly than conventional asphalt pavement compositions. A combination of the rubber and asphalt as set forth in this application seem to mutually protect against oxidation and degradation. The composition remains pliable and elastic over a period of many years.

The elastomeric pavement repair material of the present invention has been employed in many pavement services with very satisfying results. The material has been applied to U.S. Highway 66 near Williams, Arizona. This highway is subject to heavy vehicular traffic and also to wide variations in weather. During the summer, the highway is blistering hot and during the winter, the highway is subject to subzero temperatures. However, the portion of the highway repaired with the elastomeric composition has withstood these conditions for over five years without any crack reflection or other deleterious effects. In addition, this material has been used to repair airport runways, taxiways, refueling areas and access roads. Runway areas repaired with this material have been able to withstand the repeated pounding of large jet airliners such as the Boing 747, which weigh more than 500,000 lbs without damage to the repaired area. It has been demonstrated and proven that the present elastomeric pavement repair material will outlast conventional patching materials many times over.

The elastomeric pavement repair composition of the present invention has much lower temperature susceptibility than conventional asphalt and is less prone to brittleness in cold weather and bleeding in hot weather.

Prefabricated patches prepared from the elastomeric composition have been applied to mountain roads (elevation 7000 feet) wherein the patches are subject to below freezing and 100° F plus temperatures. Many of these patches are over seven years old and are still showing no sign of cracking or stripping.

The adhesion characteristics of the elastomeric pavement repair material in the presence of water have proven to be far superior to that of asphalt alone and the susceptibility of aggregate stripping has been reduced to a level far below that of normal asphalt-aggregate pavement.

When the hot elastomeric pavement repair material is applied as a membrane over a pavement area, it forms an impervious surface or layer which prevents the entry of water through the cracks to enter the base and subgrade underlying the pavement surface. This results in a long term stabilization of the subgrade and base moisture which tends to reduce the magnitude of the deflections in the more stabilized subgrade. The rapid progression of local failure is often due to reduced subgrade support caused by the entrance of surface water through the surface cracks in the pavement.

Small localized areas which require repair may be repaired with the hot elastomeric pavement repair composition by using a conventional concrete pavement rubberized asphalt joint filling kettle (oil jacketed type) for mixing and spreading the material. This type of equipment has a self-contained agitator and positive displacement pump for mixing and applying the hot elastomeric pavement repair composition. The composition can be placed on small areas using a spray nozzle or using a joint filling wand. The material may be spread and smoothed with a squeegee. The material can then be dressed by hand sanding or covering with aggregate chips.

EXAMPLE IX

An hot elastomeric material prepared from 120-150 penetration grade asphalt which was heated to a temperature between about 350° and 400° F. Ground tire rubber, 16-25 mesh was added to the hot asphalt in the proportions of 3 parts of asphalt to about 1 part rubber. The resulting mixture was stirred causing the mixture to become a jellied composition which occurred within one-half to 1 hour after the introduction of the rubber. The addition of the rubber cooled the resulting mixture by about 50° F. The hot elastomeric material was then sprayed onto the pavement area to be repaired which had been first brushed clean of all foreign debris and dressed with aggregate.

The elastomeric composition can be used to completely surface old or new pavements or roofs. It can be used to form a waterproof membrane for a road base or a waterproof liner for canals, reservoirs, ponds, including leaching and solar ponds, tanks, culverts and pipes. The composition can also be used as an underseal, sound deadening material, joint and crack filler, binder or as a membrane material to combat soil erosion.

EXAMPLE X

Five batches of an asphalt-rubber composition were prepared from grade AR-1000 Los Angeles basin asphalt (120-150 penetration grade) and ground tire rubber (−#16 to +#25 U.S. Standard size mesh). The batches contained asphalt and rubber in the following weight ratios:

| Batch No. | Parts Asphalt | Parts Rubber | % Rubber |
|---|---|---|---|
| A | 3 | 1 | 25 |
| B | 4 | 1 | 20 |
| C | 5 | 1 | 16 2/3 |
| D | 6 | 1 | 14 2/7 |
| E | 7 | 1 | 12 1/2 |

Each batch was prepared by heating the asphalt to a temperature of about 410° F. The proper proportion of ground rubber was added to the hot asphalt and mixed therein for about 10 minutes to form a jellied composition. The resulting batches of asphalt-rubber compositions were tested to determine their elastomeric properties with respect to temperature susceptibility.

METHOD NO. 1

Strips of the asphalt-rubber material, 16 inches long, one inch wide and one-eighth inch thick, were prepared from batches A through E on a jig using release type paper flooring and ⅛ inch welding rod walls. After the strips were formed, the paper flooring was stripped off and the strips were refrigerated overnight (about 16 hours).

During each test, a strip was quickly bent over a 12 inch diameter cylinder to effect a smooth 13.5 bending of the strip. At −20° F, all strips cracked when bent. Additional strips were tested at progressively higher temperatures and the results were observed which are shown in the drawing (Graph #1) and the following table. (The elastomeric failure of a strip were deemed to have been achieved when the strip cracked when bent on the cylinder):

| Batch No. | Lowest Temperature (degrees F.) wherein no elastomeric failure was observed. |
|---|---|
| A | −10° F. |
| B | −4° F. |
| C | −2° F. |
| D | 10° F. |
| E | 28° F. |

As graphically shown in the drawing, the elastomeric properties of the asphalt-rubber compositions containing at least about 16-⅔% rubber (batches A, B and C) show less temperature susceptibility with respect to elastomeric properties than asphalt rubber compositions containing no more than about 14-2/7% rubber (batches D and E).

METHOD NO. 2

Strips of asphalt-rubber compositions from batches A through E, 4-½ inches long, 1 inch wide and ⅛ inch thick, were prepared on index cards (3 inches by 5 inches) on a jig using ⅛ inch welding rod walls. After the strips were formed, they were cooled by refrigeration.

Each strip was tested for elastomeric temperature susceptibility by placing the strip, index card side up, on two ⅛ inch thick spacers spaced 1.5 inches apart in parallel fashion. A mandrel (3 inches wide and one-eighth inch thick) was forced down on the index card side of the strip for a distance of one-eighth inch over the center of the gap between the spacers to affect a sharp 9½° bending of the strip. The test was repeated on each strip at progressively cooler temperatures until the strip cracked, indicating elastomeric failure. The observed results are shown in the drawing (Graph #2) and the following table:

| Batch No. | Lowest Temperature (degree F) wherein elastomeric failure was first observed |
|---|---|
| A | 30° F |
| B | 35° F |
| C | 37° F |
| D | 50° F |
| E | 50° F |

As graphically shown in the drawings, elastomeric materials containing at least about 16⅔% rubber, exhibit much better low temperature susceptibility with respect to elastomeric failure, than asphalt-rubber compositions containing no more than about 14 2/7% rubber.

It appears from the above tests that elastomeric compositions of asphalt and rubber containing at least about one part rubber to about five parts asphalt, have superior elastomeric low temperature susceptibility compared to asphalt-rubber compositions containing about one part rubber to about six or more parts asphalt.

What is claimed is:

1. An elastomeric material consisting essentially of paving grade asphalt and non-oil resistant asphalt-soluble rubber; the material being prepared by heating paving grade asphalt to a temperature of from about 300° F to about 500° F to yield hot liquid asphalt; mixing between about one part and about five parts by weight of the hot asphalt with about one part by weight particulate non-oil resistant asphalt-soluble rubber to form a jellied composition.

2. The material as defined in claim 1 wherein the asphalt is heated to a temperature of from about 350° F to about 425° F.

3. The material as defined in claim 1 wherein the asphalt is paving grade asphalt having a penetration range of 10 through 300.

4. The material as defined in claim 1 wherein the particulate rubber has a mesh size of from about −#4 to about +#200.

5. The material as defined in claim 1 wherein the asphalt is selected from paving grade asphalts having a penetration grade of from about 10-10 to about 200-300.

6. The material as defined in claim 1 wherein the rubber is unvulcanized, vulcanized or reclaimed rubber selected from the group consisting of natural rubbers, isoprene rubber, butadiene rubber, butadiene-styrene rubber, butyl rubber, ethylene propylene rubber and mixtures thereof.

7. The material as defined in claim 1 wherein the rubber is selected from the group consisting of ground whole tire rubber, tire rubber buffings, ground rubber innertubes, asphalt soluble rubber, reclaimed rubber and partially devulcanized reclaimed rubber prepared from whole tire rubber, tire rubber buffings and ground rubber innertube.

8. The material as defined in claim 1 wherein the particulate rubber has a mesh size of from about −#16 to about +#25.

9. The material as defined in claim 1 wherein the rubber is selected from the group consisting of reclaimed rubber and partially devulcanized reclaimed rubber prepared from whole tire rubber, tire rubber buffings and ground rubber innertubes.

10. The material as defined in claim 9 wherein the asphalt is paving grade asphalt having a penetration grade of from about 10-10 to about 200-300.

11. A method of sealing joints and cracks in structures which comprises the steps of:
 a. preparing a hot elastomeric material consisting essentially of paving grade asphalt and non-oil resistant asphalt-soluble rubber by heating paving grade asphalt to a temperature of from about 300° F to about 500° F to form hot liquid asphalt, and mixing from about one part to about five parts by weight of the hot asphalt with about one part by weight of particulate non-oil resistant asphalt-soluble rubber to form a jellied composition;
 b. injecting the hot elastomeric material into the crevice of a joint or crack to seal and fill the same; and
 c. allowing the injected elastomeric material to cool.

12. The method as defined in claim 11 including the additional step of dressing the exposed surface of the injected material with aggregate chips or sand before the injected material cools.

13. The method as defined in claim 11 including the step of dressing the exposed surface of the injected material with a plastic, rubber or felt sheet before the injected material cools.

14. The method as defined in claim 11 including the additional step of cleaning the crevice before injecting the hot elastomeric material into the crevice.

15. The method as defined in claim 11 including the additional step of routing or chiseling the surfaces of the crevice before injecting the hot elastomeric material into the crevice.

16. The method according to claim 11 wherein the asphalt is paving grade asphalt having a penetration grade of from about 10-10 to about 200-300.

17. The method according to claim 11 where the asphalt is heated to a temperature of from about 350° F to about 425° F.

18. The method according to claim 11 wherein the mesh size of the particulate rubber is about −#4 to about +#200.

19. The method according to claim 11 wherein the rubber is unvulcanized, vulcanized or reclaimed rubber selected from the group consisting of natural rubbers, isoprene rubber, butadiene rubber, butadiene-styrene rubber, butyl rubber, ethylene propylene rubber and mixtures thereof.

20. The method according to claim 11 wherein the rubber is selected from the group consisting of ground whole tire rubber, tire rubber buffings, ground rubber innertubes, asphalt soluble rubber, reclaimed rubber and partially devulcanized reclaimed rubber prepared from whole tire rubber, tire rubber buffings and ground rubber innertubes.

21. The method as defined in claim 11 including the step of dressing the exposed surface of the injected material with a plastic, rubber or felt film before the injected material cools.

22. The method as defined in claim 11 including the additional step of chiseling the surfaces of the crevice before injecting the hot elastomeric material into the crevice.

* * * * *